United States Patent
Matthais et al.

(10) Patent No.: US 11,732,622 B2
(45) Date of Patent: Aug. 22, 2023

(54) METHOD FOR PRODUCING A HOLLOW VALVE WITH AN OPTIMISED INTERIOR STEM GEOMETRY FOR INTERNAL COMBUSTION ENGINES

(71) Applicant: FEDERAL-MOGUL VALVETRAIN GMBH, Barsinghausen (DE)

(72) Inventors: Thorsten Matthais, Garbsen (DE); Antonius Wolking, Barsinghausen (DE); Guido Bayard, Dortmund (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 0 days.

(21) Appl. No.: 17/057,469

(22) PCT Filed: Apr. 18, 2019

(86) PCT No.: PCT/EP2019/060103
§ 371 (c)(1),
(2) Date: Nov. 20, 2020

(87) PCT Pub. No.: WO2019/223941
PCT Pub. Date: Nov. 28, 2019

(65) Prior Publication Data
US 2021/0199029 A1    Jul. 1, 2021

(30) Foreign Application Priority Data
May 23, 2018  (DE) ............... 10 2018 112 295.0

(51) Int. Cl.
*F01L 3/14*     (2006.01)
*B21D 22/16*    (2006.01)
*B21K 1/22*     (2006.01)

(52) U.S. Cl.
CPC ............ *F01L 3/14* (2013.01); *B21D 22/16* (2013.01); *B21K 1/22* (2013.01); *F01L 2301/00* (2020.05)

(58) Field of Classification Search
CPC .......... B21D 22/16; B21D 53/10; B21K 1/22; B23P 15/002; F01L 3/14; F01L 2301/00
See application file for complete search history.

(56) References Cited

U.S. PATENT DOCUMENTS 2,411,734 A * 11/1946 Kerwin ............... B21K 1/22
                                              123/188.1
6,006,713 A    12/1999 Gebauer
(Continued)

FOREIGN PATENT DOCUMENTS

DE       10057192 B4    12/2009
DE    102015220891 A1 *  4/2017 ............... F01L 3/14
(Continued)

OTHER PUBLICATIONS

International Search Report, dated Aug. 5, 2019 (PCT/EP2019/060103).

*Primary Examiner* — David P Bryant
*Assistant Examiner* — Christine Bersabal
(74) *Attorney, Agent, or Firm* — Robert L. Stearns; Dickinson Wright PLLC

(57) ABSTRACT

A method for producing a valve body of a hollow valve with optimised interior stem geometry includes a preform with a valve plate and a tubular wall surrounding a cavity. Flow forming the tubular wall over a flow-forming mandrel, which is inserted into the cavity to enlarge a length of the tubular wall. An interior area of the tubular wall is embossed with a structure either due to the fact that the flow-forming mandrel is a structuring mandrel having a surface structure, or alternatively, because the method includes a further step of reducing an outer diameter of the tubular wall by swaging (Continued)

or drawing and ironing over a structuring mandrel. Furthermore, a hollow valve is produced by this method.

15 Claims, 2 Drawing Sheets

(56) References Cited

U.S. PATENT DOCUMENTS

| | | | | |
|---|---|---|---|---|
| 6,442,988 | B1* | 9/2002 | Hamstra | B21D 22/16 |
| | | | | 72/379.4 |
| 8,713,793 | B2* | 5/2014 | Morii | F01L 3/14 |
| | | | | 29/888.4 |
| 9,302,317 | B2* | 4/2016 | Morii | F01L 3/20 |
| 2016/0059286 | A1* | 3/2016 | Kunimoto | B21D 22/16 |
| | | | | 72/118 |
| 2018/0304344 | A1* | 10/2018 | Kellermann | B21H 7/00 |

FOREIGN PATENT DOCUMENTS

| | | |
|---|---|---|
| DE | 102015220891 A1 | 4/2017 |
| DE | 102015118495 A1 | 5/2017 |
| EP | 0898055 A1 | 2/1999 |
| JP | 2014084725 A | 5/2014 |

* cited by examiner

METHOD FOR PRODUCING A HOLLOW VALVE WITH AN OPTIMISED INTERIOR STEM GEOMETRY FOR INTERNAL COMBUSTION ENGINES

BACKGROUND

1. Technical Field

The present invention relates to a method for producing hollow valves, or valves with an interior cavity, for internal combustion engines and to hollow valves produced using this method. In particular, the present invention relates to hollow valves with an optimised interior stem geometry to achieve improved internal cooling.

2. Related Art

Intake and outlet valves are thermally and mechanically stressed components in internal combustion engines. Sufficient cooling is therefore necessary to ensure the long-term functioning of the valves. Herein, hollow head valves are advantageous compared to solid-stem valves and hollow-stem valves (i.e. a hollow valve in which a cavity is provided only in the stem), since a cavity is present both in the stem and in the valve head, which makes it possible to achieve improved internal cooling—by means of a cooling medium, e.g. sodium. Other benefits include lighter weight, the prevention of hot spots and the reduction of $CO_2$. The cooling can be further improved by optimising the interior stem geometry by means of a structure to increase the heat transfer both within the cavity, i.e. by means of a cooling medium located within it, as well as between the valve wall and the cooling medium. Herein, it is known, for example, to use inserts inserted into the stem via the drilled head area; see DE 10057192 B4.

Hollow valves are usually produced via a combination of different processes, such as forging, turning and welding. Herein, turning or milling the cavity is particularly costly. Spot welds on the head surface or at other operationally critical points should also be avoided. Another disadvantage of known methods is that they often require a large number of process steps. For example, EP 0898055 A1 relates to a hollow head valve, which is produced by closing a hollow blank by means of welding.

DE 102015118495 A1 discloses a method for producing a valve tappet consisting of metal, which method comprises: providing a blank, deforming the blank in a non-cutting manner, and reducing the diameter of a hollow stem with simultaneous axial stretching by means of at least one forming roller rotating concentrically relative to the hollow stem. JP 2014084725 A discloses the production of a hollow valve by means of swaging, wherein the valve stem has an interior structure.

Thus, the problem underlying the present invention is to provide a production method for hollow valves, or for a valve body for hollow valves, with optimised interior stem geometry, which does not have the aforementioned disadvantages and at the same time has a high productivity and good material utilisation.

SUMMARY

A method for producing a valve body of a hollow valve comprises the steps of: providing a preform with a valve head and a tubular wall surrounding a cylindrical cavity; flow forming the tubular wall over a structuring mandrel having a surface structure, which is inserted into the cavity to enlarge a length of the tubular wall.

Furthermore, a method for producing a valve body of a hollow valve with optimized interior stem geometry is disclosed as an example; wherein the method for producing a valve body of a hollow valve with an optimised interior stem geometry comprises the steps of: Providing a preform with a valve head and a tubular wall surrounding a cylindrical cavity; flow forming the tubular wall over a flow-forming mandrel, which is inserted into the cavity to enlarge a length of the tubular wall; and reducing an outer diameter of the tubular wall by swaging or drawing and ironing over a structuring mandrel having a surface structure.

According to one aspect of the present invention, providing the preform may include: Providing a bowl-shaped semi-finished product, wherein the semi-finished product has the tubular wall surrounding the cylindrical cavity of the semi-finished product and has a bottom section; and forming the valve head from the bottom section.

According to a further aspect, providing the bowl-shaped semi-finished product may include: Providing at least a partially cylindrical blank; and forming the bowl-shaped semi-finished product from the blank.

According to a further aspect, forming the bowl-shaped semi-finished product can be executed by impact extrusion or forging.

According to a further aspect, forming the valve head can be executed by impact extrusion or forging.

According to a further aspect, several forming rollers can be used during the flow forming process, wherein preferably three forming rollers are used.

According to a further aspect, the multiple forming rollers can be offset radially and axially to each other during the flow forming process.

According to a further aspect, the method furthermore may include: Reducing an outer diameter of the tubular wall without using a mandrel.

According to a further aspect, reducing the outer diameter of the tubular wall can be executed by swaging or necking.

According to a further aspect, the surface structure of the structuring mandrel may be present in the form of grooves.

According to a further aspect, a depth of the grooves can increase in the axial direction starting from the end of the structuring mandrel located at the valve head.

According to a further aspect, the surface structure can enlarge the surface of the structuring mandrel by 30% to 100%, preferably 50% to 70%, compared to a circumferential surface of a circular cylinder with a diameter that is equivalent to an average diameter of the structuring mandrel.

According to a further aspect, the indentations embossed into the tubular wall by the surface structure of the structuring mandrel can extend to a depth corresponding to 10% to 30% of a total wall thickness of the tubular wall.

According to a further aspect, the method furthermore may include: Filling a cooling medium, in particular sodium, into the cavity; and closing the cavity.

The problem is furthermore solved by a hollow valve, which comprises a valve body, which was produced using one of the aforementioned methods.

THE DRAWINGS

In the following, exemplary embodiments of the invention are described in more detail with reference to the figures, wherein FIGS. 1A-1F show different intermediate steps of the production process according to the invention of a valve body of a hollow valve (shown in FIG. 1D or FIG. 1F) from a blank (shown in FIG. 1A);

Figures 1A, 1B, 1C, 1D, 1E, 1F:
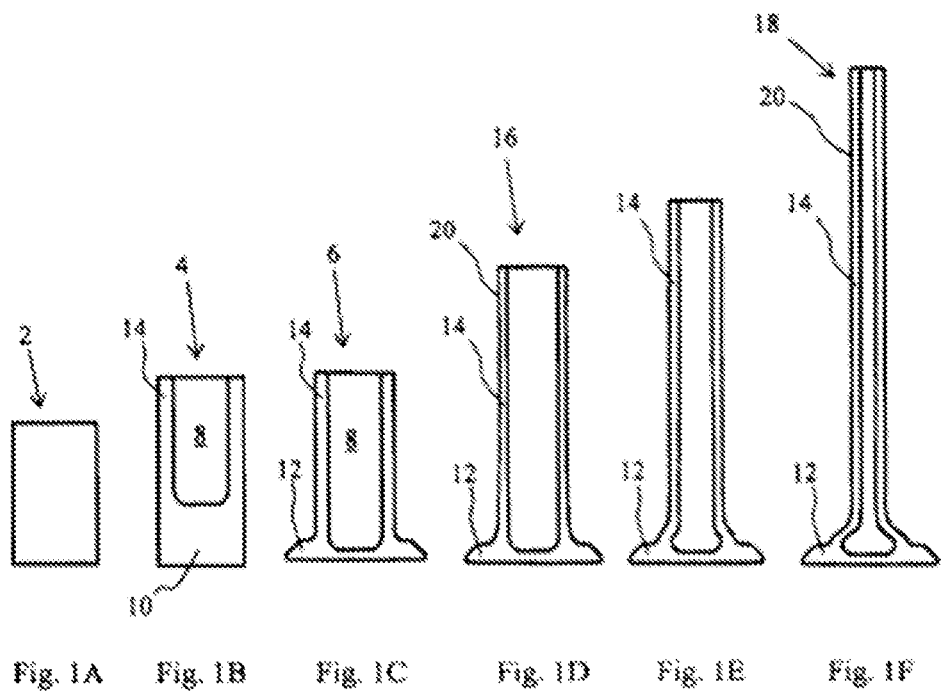

In the following, identical reference marks are used for equivalent or similar elements or components in both the description and the drawing. A list of reference numbers is also specified, which applies to all drawings. The representations shown in the drawings are merely schematic and do not necessarily represent the actual size ratios.

DETAILED DESCRIPTION

During the production process according to the invention of a hollow valve, or a valve body for a hollow valve, a flow-forming mandrel/regular mandrel with structured surface is used, either during flow forming or while reducing the outer diameter of the tubular wall, to produce an optimized interior stem geometry. Such a flow-forming mandrel or regular mandrel provided with a surface structure is referred to as a "structuring mandrel" in the context of this application (for both alternatives).

The "optimised interior stem geometry" therefore consists of a surface structure embossed into the interior surface (interior area) of the valve stem, which has indentations or protrusions. This surface structure enlarges the surface, i.e. the surface area, of the interior area of the valve stem; the heat exchange between a cooling medium optionally filled into the cavity and the wall of the valve stem is thus improved, thereby facilitating the cooling of the resulting hollow valve. The surface structure of the structuring mandrel preferably is designed such that the surface of the structuring mandrel (i.e. its surface area) is enlarged by 30% to 100%, preferably 50% to 70%, compared to a circumferential surface of a circular cylinder with a diameter that is equivalent to an average diameter of the structuring mandrel. The complementary interior area of the valve stem is enlarged accordingly, i.e. by the same amount.

Preferably, the surface structure of the structuring mandrel (both of one used in flow forming as well as of a structured mandrel used in reducing the outer diameter) has the form of grooves at least partially extending in the longitudinal direction, wherein a depth of the grooves preferably increases in the axial direction (longitudinal direction, see below) starting from the end of the structuring mandrel located at the valve head during this method step. Furthermore, the surface structure of the structuring mandrel preferably is such that the indentations embossed into the tubular wall extend to a depth corresponding to 10% to 30% of a total wall thickness of the tubular wall.

In FIGS. 1A to 1F, different intermediate stages of the production process according to the invention are shown in sectional views, wherein optional or preferred production steps/intermediate stages are also shown.

A blank 2 from a valve steel known to a person skilled in the art, see FIG. 1A, preferably serves as a starting point. The blank has an at least partially cylindrical form, preferably a circular cylindrical form, according to the circular form of the valve body or valve to be produced.

The blank 2 is deformed into a bowl-shaped semi-finished product (workpiece) 4 shown in FIG. 1B. The semi-finished product 4 in the form of a bowl comprises a bottom section 10, from which a valve head (valve plate) 12 is subsequently formed, and a tubular wall (annular wall) 14, which surrounds a cylindrical, preferably circular cylindrical, cavity 8 of the bowl-shaped semi-finished product 4 and from which a valve stem 20 is subsequently formed. Herein, material may flow between the bottom section 10 and the tubular wall 14 during the subsequent deforming steps. More generally, according to the invention, the bowl-shaped semi-finished product 4 is provided directly; the method then starts with providing the bowl-shaped semi-finished product 4 shown in FIG. 1B.

In a subsequent forming step, the valve head 12 is formed from the bottom section 10. A preform 6 of the valve body obtained in this manner is shown in FIG. 1C. In general, the preform 6 can be provided directly.

Both the deforming of the blank 2 into a bowl-shaped workpiece 4 as well as the forming of the valve head 12 from the bottom section 10 can be executed by means of a hot or cold deforming process, for example. Preferably, impact extrusion or forging is used. In impact extrusion, a punch is pressed into the blank 2 or the semi-finished product 4 to form the cavity 8 or the valve head 12, i.e. it is essentially a (bowl) reverse extrusion or lateral extrusion process. The preform 6 can also be formed directly from the blank 2 in a single deforming step, e.g. by means of forging or impact extrusion.

In the next processing step, from FIG. 1C to FIG. 1D, an axial length of the tubular wall 14 is enlarged. 'Axial' refers here to the direction defined by the tubular wall 14 (i.e. the portion which will become the stem), i.e. to the (centre) axis of the tubular wall; 'radial' correspondingly is a direction orthogonal to the axial direction. A length of the tubular wall 6 therefore is measured in the axial direction (longitudinal direction).

Figure 2:
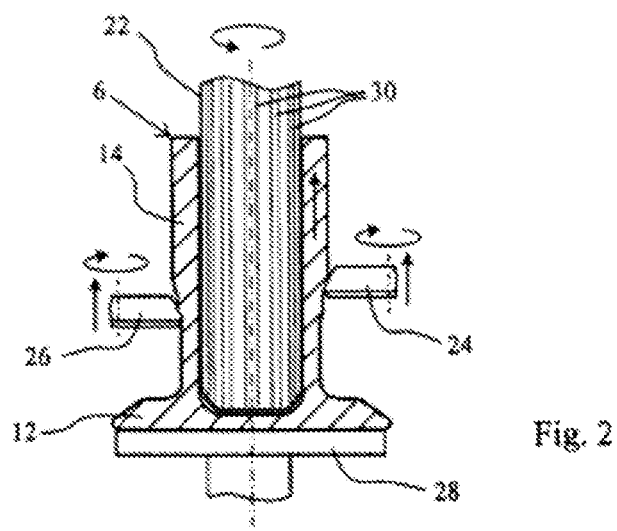
FIG. 2 shows a sectional view during the flow forming process.

For this purpose, according to the invention, a flow forming or cylinder flow forming process is executed over a flow-forming mandrel 22; see. FIG. 2. During the flow forming process, the preform rotates and at least one forming roller 24, 26 rotating along due to frictional engagement is pressed against the outside of the tubular wall 14 and is moved in the axial direction, such that plastic deformation results. The incremental deformation associated with this leads to an advantageous work hardening of the machined steel. Overall, the wall thickness of the tubular wall decreases while at the same time the axial length of the tubular wall increases. The at least one forming roller is optionally displaced several times in the axial direction until the desired increase in length or reduction in wall thickness is achieved. Therein, the radial distance of the at least one forming roller to the axis of the tubular wall is successively reduced during successive passes.

The flow forming process therefore essentially leads to an elongation of the tubular wall 14, due to the flow-forming mandrel used herein, wherein the outer diameter of the tubular wall 14 decreases a little, corresponding to the decrease of the wall thickness. If a larger decrease of the outer diameter is desired, a flow forming process can also be executed without the flow-forming mandrel.

If the interior stem geometry according to the invention is to be created during the flow forming process, the flow-forming mandrel 22 has a (three-dimensional) structure on its (circumferential) surface in the form of protrusions or indentations, in order to emboss a structure during the flow forming of the interior surface of the tubular wall 14, which structure is complementary to the surface structure of the compression roller. The flow-forming mandrel then is a structuring mandrel.

If dimensions of the preform 6 and parameters of the flow forming process are chosen such that the length of the tubular wall 14 achieved by executing the flow forming process, the external diameter achieved by the flow forming process and an interior diameter of the tubular wall 14 of the preform (which corresponds to a diameter of the flow-forming mandrel) correspond to the desired dimensions of the hollow valve to be produced, a valve body 16 for a hollow-stem valve can be obtained in this manner (see. FIG. 1D, wherein it should be noted that the relative dimensions shown in the drawings do not have to correspond to the actual relative dimensions; in particular, in FIG. 1D the diameter of the valve plate/head in relation to the stem diameter is shown smaller than at a typical actual valve; likewise the stem diameter is greater than usual in relation to the length of the stem). In this case, a flow-forming mandrel with a surface structure, i.e. a structuring mandrel, is used in the flow forming process; see FIG. 2.

Subsequently (from FIG. 1D via FIG. 1E to FIG. 1F), the outer diameter of the tubular wall 14 is reduced, optionally, to obtain a completed valve body 18 for a hollow head valve, the valve stem 20 of which has a predetermined outer diameter, i.e. a desired target diameter; see FIG. 1F. This deforming step is preferably executed without inserting the mandrel, such that the diameter can be effectively reduced. This step, in addition to resulting in a reduction of the outer diameter, also leads to a further elongation of the tubular wall 14 and, if executed without a mandrel, to an increase in the wall thickness of the tubular wall 14. The wall thickness would therefore optionally be adjusted slightly smaller in the preceding flow forming step, in order to obtain a certain wall thickness, and thus a certain inner diameter at a given outer diameter D, taking into account the increase in thickness in the final step. If a structuring mandrel was used during the flow forming process, the reduction of the outer diameter of the annular wall 14 should be performed without a mandrel.

The reduction of the outer diameter of the tubular wall 14 can be done by swaging or necking (diameter reduction by constricting), wherein swaging is preferable. Likewise, it is possible to reduce the outer diameter of the tubular wall 14 by drawing and ironing over a mandrel, in particular a structuring mandrel. Preferred is the use of swaging.

When swaging, it is important that no further deforming step of the valve body 18 for a hollow head valve takes place after the swaging to reduce the outer diameter of the tubular wall 14, as this would degrade the positive material properties obtained by the swaging. Swaging is therefore the final deforming step in this case. Swaging is an incremental, compressive deforming process in which the workpiece to be machined is hammered in a quick sequence from different sides in a radial direction. Due to the resulting pressure, the material 'flows', so to speak, and the material structure is not distorted by tensile stresses. Preferably, swaging is carried out as a cold deforming process, i.e. below the recrystallization temperature of the processed material. The essential advantage of the use of swaging as a final deforming step is therefore that compressive stresses are induced during swaging by applying radial forces, whereby the occurrence of tensile stresses, which increase the susceptibility to cracks, is prevented; in particular, this is true for the edge layers of the hollow stem. The swaging thus interacts with the previous, also incremental deforming method of flow forming in an advantageous way, such that optimal material properties, e.g. strength, are achieved.

Further advantages of swaging as a final deforming step—compared to extrusion methods or necking—are provided due to a better surface quality achievable in this manner and a relatively greater diameter reduction of the stem per step. Due to the high surface quality achievable and the fact that the feasible tolerances for swaging are very small, a finishing of the valve stem is usually not necessary. Free-forming methods or upset-forging methods—such as necking—generally only achieve a poorer surface quality or tolerance compliance. Accordingly, it is specified that no further method step should be executed after the swaging process to reduce the outer diameter of the tubular wall by means of an extrusion method or necking.

Reducing the outer diameter can executed in multiple partial steps (an intermediate step is shown in FIG. 1E, for example), wherein the individual partial steps can be executed either with or without a mandrel (at the beginning of a partial step, the diameter of a mandrel may be smaller than the diameter of the cavity); furthermore, a diameter of the mandrels can be reduced between successive partial steps.

If the flow-forming mandrel is not structured and the interior stem geometry according to the invention is to be generated during the reduction of the outer diameter, a structuring mandrel is used when reducing the outer diameter, which has a (three-dimensional) structure at its (circumferential) surface with protrusions or indentations to emboss the structure of the inner surface of the valve stem. The mandrel used in reducing the outer diameter is therefore a structuring mandrel in this case. In this case, swaging or drawing and ironing is used as a method for reducing the diameter. If multiple mandrels are used, the last used mandrel should be a structuring mandrel (mandrel with structured surface).

In order to complete the production process of the valve body of a hollow valve, a cooling medium, e.g. sodium, can furthermore be filled into the cavity of the valve body via the outwardly open end of the valve stem, after which this end of the valve stem is closed, for example by a valve stem end cap, which is attached, for example, by means of friction welding or another welding method (not shown in the drawings).

FIG. 2 represents the method step of flow forming, which takes place between FIG. 1C and FIG. 1D, in a sectional representation. Herein, a flow-forming mandrel 22 is inserted into the cavity of the preform 6. The flow-forming mandrel rotates together with the preform 6 and a tailstock 28, which supports the preform on the valve bottom. Furthermore, the flow-forming mandrel 22 is shown here as a flow-forming mandrel with a surface structure, i.e. it is a structuring mandrel, the circumferential surface of which is provided with grooves 30 extending in a longitudinal direction as an example here (the section of the sectional representation extends only through the preform 6, not through the flow forming/structuring mandrel 22). Thus, the structuring of the interior area of the tubular wall 14 here is executed during the flow forming process. If the structuring takes place during the reduction of the outer diameter of the tubular wall 14, a flow-forming mandrel without surface structuring, i.e. with a smooth surface, can be used.

Two opposing forming rollers 24, 26, which also rotate by means of frictional engagement, are pressed against the tubular wall 14. The forming rollers 24, 26 are moved in the axial direction relative to the preform, which leads to a plastic deformation of the tubular wall 14, wherein the outer radius of the tubular wall 14 decreases and at the same time the length of the tubular wall 14 increases (in the axial direction). Herein, the material of the tubular wall 14 "flows" in the direction of motion of the forming rollers 24, 26 (synchronised forming rollers). The rotational directions of the preform 6 (together with the flow-forming mandrel 22 and tailstock 28) and the forming rollers 24, 26, the direction of motion of the forming rollers 24, 26 and the flow direction of the material of the tubular wall 14 are indicated in the drawing by arrows.

In FIG. 2, two forming rollers 24, 26 are (partially) represented as an example; also possible is the use of only one or more than two forming rollers, wherein the use of two or three forming rollers is preferred. If multiple forming rollers are used, these are preferably distributed evenly across the circumference; i.e. in the case of two forming rollers, the angle (in the circumferential direction) between the forming rollers is about 180°, with three forming rollers about 120°, etc. Thereby, the preform is in particular supported in all directions.

Preferably, there is a radial and an axial offset between the forming rollers, as shown in FIG. 2. The term "radial offset" is meant to indicate that the radial distances of the respective forming rollers 24, 26 from the centre axis are different. The axial offset is achieved by displacing the forming rollers 24, 26 at different times, wherein the order (clearly) is such that the forming roller with the largest radial distance from the centre axis is displaced first, followed by that with the second largest radial distance, etc. In this way, the method can be accelerated, as several radius or wall thickness reduction steps can be executed in one pass. Instead of a radial offset of forming rollers of the same diameter, forming rollers with different diameters can also be used.

Figure 3A:
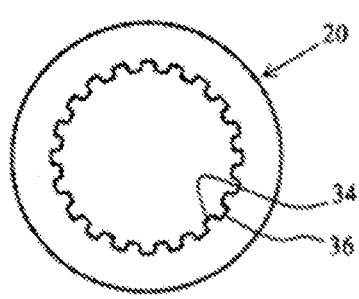
FIG. 3A shows a sectional view of a valve stem of a valve body produced in a manner according to the invention.
Figure 3B:
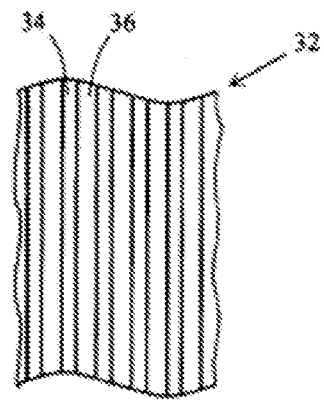
FIG. 3B shows a partial flattened representation of the interior area of the valve stem of the embodiment shown in FIG. 3A.

FIG. 3A, in a section perpendicular to the longitudinal direction, represents an example of a structure of the interior area of the valve stem 20 (or the tubular wall), wherein protrusions 34, which extend parallel to the longitudinal axis, are arranged at the interior area of the valve stem 20; i.e. they are ribs. Indentations 36 are located between the respective protrusions (ribs) 34. FIG. 3B represents a detail of an associated flattened representation of the ribbed interior area 32 of the valve stem.

Figure 4A:
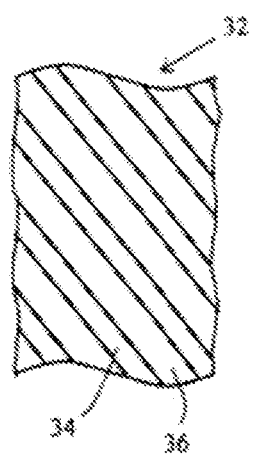
FIGS. 4A-4C show partially flattened representations of the interior area of the respective valve stems of further embodiments according to the invention.
Figure 4B:
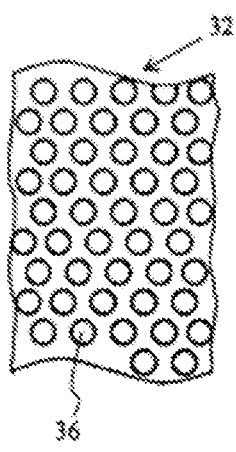
Figure 4C:
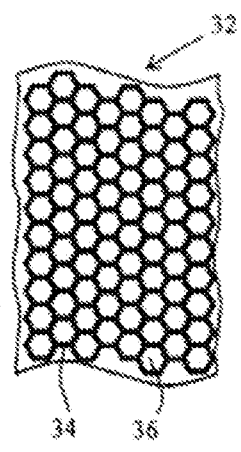

In addition to ribs extending in the longitudinal direction, other structuring options are also possible. Examples are: ribs extending at an angle [underline handwritten] (FIG. 4A); indentations that are circular in a top view, in particular indentations in the form of a spherical segment (similar to a golf ball) (FIG. 4B); and honeycomb-shaped structures with adjacent honeycombs (hexagons) (FIG. 4C); wherein the FIGS. 4A-4C, like FIG. 3B, each represent a detail of a flattened representation of the interior area 32 of the respective valve stem. In FIG. 4B, only indentations embossed in the surface of the interior area 34 are shown. The structure according to FIG. 4A and FIG. 4C comprises both protrusions 34 and indentations 36.

The structuring mandrels 10 used for creating the surface structure of the tubular wall 14 or the valve stem 20 according to FIGS. 3A-3B and 4A-4C each have a surface structure, which is complementary to the surface structure shown in the respective drawing.

For example, the surface structure can be grooved or knobbed.

The invention claimed is:

1. A method for producing a valve body of a hollow valve with optimized interior stem geometry, comprising the steps of:
   providing a preform with a valve head and a tubular wall surrounding a cylindrical cavity;
   flow forming the tubular wall over a mandrel, which is inserted into the cavity, to enlarge a length of the tubular wall,
   wherein multiple forming rollers are used in the flow forming process;
   wherein the mandrel is provided with a non-cylindrical outer surface structure, and wherein the multiple forming rollers are offset radially and axially to each other during the flow forming process.

2. The method according to claim 1, wherein the step of providing the preform with the valve head and the tubular wall surrounding the cylindrical cavity comprises:
   Providing the preform as a bowl-shaped semi-finished product, wherein the semi-finished product has the tubular wall surrounding the cylindrical cavity of the semi-finished product and has a bottom section; and
   thereafter forming the valve head from the bottom section.

3. The method according to claim 2, wherein the valve head is formed by impact extrusion or forging.

4. The method according to claim 2, wherein providing the bowl-shaped semi-finished product comprises:
   providing an at least partially cylindrical blank; and
   forming the bowl-shaped semi-finished product from the blank.

5. The method according to claim 4, wherein the bowl-shaped semi-finished product is formed by impact extrusion or forging.

6. The method according to claim 2, wherein three forming rollers are used in the flow forming process.

7. The method according to claim 1, further comprising: reducing an outer diameter of the tubular wall without using a mandrel.

8. The method according to claim 7, wherein the outer diameter of the tubular wall is reduced by swaging or necking.

9. The method according to claim 1, wherein the non-cylindrical structure of the structuring mandrel is present in the form of grooves.

10. The method according to claim 9, wherein a depth of the grooves increases in an axial direction starting from an end of the structuring mandrel located at the valve head.

11. The method according to claim 1, wherein the non-cylindrical outer surface structure has another surface area that is 30% to 100% greater compared to an outer surface area of a circular cylinder with a dimeter that is equivalent to an average diameter of the mandrel.

12. The method according to claim 1, wherein indentations are embossed into the tubular wall by the non-cylindrical surface structure of the structuring mandrel and extend to a depth corresponding to 10% to 30% of a total wall thickness of the tubular wall.

13. The method according to claim 1, further comprising:
   filling a cooling medium into the cavity; and
   closing the cavity.

14. The method according to claim 11, wherein the increase is from 50 to 70%.

15. The method according to claim 13, wherein the cooling medium is sodium.

* * * * *

UNITED STATES PATENT AND TRADEMARK OFFICE
CERTIFICATE OF CORRECTION

| | |
|---|---|
| PATENT NO. | : 11,732,622 B2 |
| APPLICATION NO. | : 17/057469 |
| DATED | : August 22, 2023 |
| INVENTOR(S) | : Thorsten Matthias, Antonius Wolking and Guido Bayard |

It is certified that error appears in the above-identified patent and that said Letters Patent is hereby corrected as shown below:

On the Title Page

Item (12) "Matthais et al." should be --Matthias et al.--.

Item (72) Inventors: Thorsten "Matthais" should be --Matthias--.

Signed and Sealed this
Twentieth Day of August, 2024

Katherine Kelly Vidal
*Director of the United States Patent and Trademark Office*